(12) United States Patent
Pedmo et al.

(10) Patent No.: US 6,988,629 B2
(45) Date of Patent: Jan. 24, 2006

(54) HOLLOW PLASTIC ARTICLE INCLUDING A VIEW STRIPE

(75) Inventors: Marc A. Pedmo, Brunswick, OH (US); Thomas J. Simpson, Marshallville, OH (US); Michael J. Sainato, Wadsworth, OH (US)

(73) Assignee: Plastipak Packaging, Inc., Plymouth, WI (US)

( * ) Notice: Subject to any disclaimer, the term of this patent is extended or adjusted under 35 U.S.C. 154(b) by 0 days.

(21) Appl. No.: 10/844,897

(22) Filed: May 13, 2004

(65) Prior Publication Data

US 2005/0252879 A1 Nov. 17, 2005

(51) Int. Cl.
*B65D 1/02* (2006.01)
*B65D 1/40* (2006.01)
*B65D 23/00* (2006.01)

(52) U.S. Cl. .................. 215/365; 215/366; 220/602; 220/662

(58) Field of Classification Search ................ 215/365, 215/366; 220/602, 662, 663, 665
See application file for complete search history.

(56) References Cited

U.S. PATENT DOCUMENTS

| 3,343,568 | A | * | 9/1967 | Branscum et al. | 138/178 |
| 4,832,211 | A | * | 5/1989 | Matthews et al. | 215/40 |
| 4,890,994 | A | * | 1/1990 | Shapler et al. | 425/131.1 |
| 5,464,107 | A | * | 11/1995 | Koeniger | 215/12.2 |
| 5,918,753 | A | * | 7/1999 | Ogg et al. | 215/382 |
| 6,077,579 | A | * | 6/2000 | De Laforcade | 428/35.7 |
| 2004/0200848 | A1 | * | 10/2004 | Roubal et al. | 220/651 |

* cited by examiner

*Primary Examiner*—Sue A. Weaver
(74) *Attorney, Agent, or Firm*—Robert H. Bachman

(57) ABSTRACT

The side wall portion of a plastic article, as a plastic container, is opaque and includes a transparent portion, as a view stripe. The opaque portion limits viewing the inside of the article, whereas the transparent portion permits viewing the inside of the article therethrough. A method for forming the plastic article is also disclosed.

6 Claims, 3 Drawing Sheets

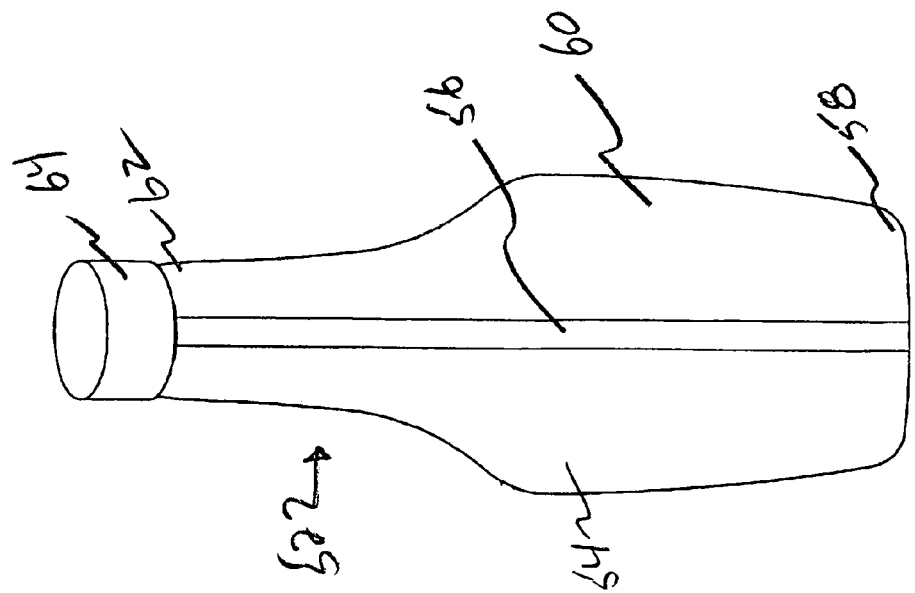
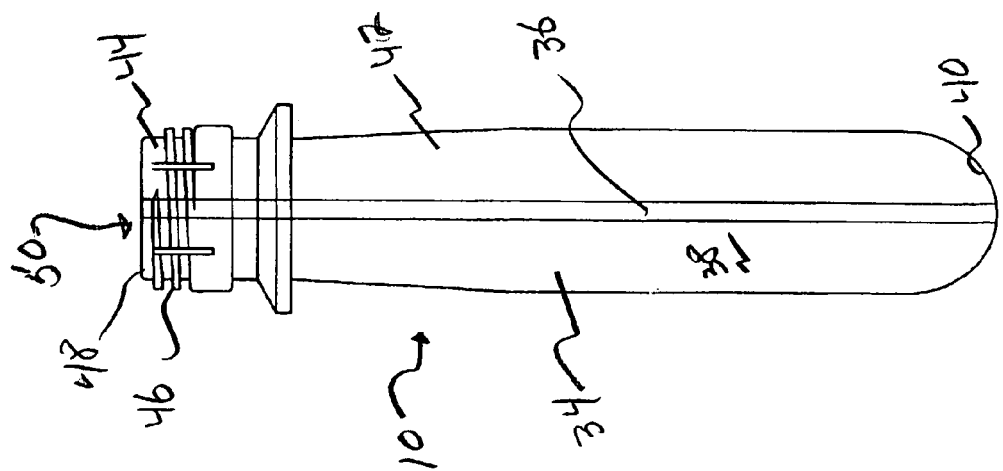

HOLLOW PLASTIC ARTICLE INCLUDING A VIEW STRIPE

BACKGROUND OF THE INVENTION

It is commercially desirable to provide opaque, hollow plastic articles, as plastic containers. These can be provided with attractive coloring so that they make a pleasing appearance on a store shelf. However, a disadvantage of an opaque container is that the opaque or colored outside wall limits viewing inside the container so that one cannot readily see the contents of the container.

It would be desirable to provide an opaque, hollow plastic article, as a plastic container, which has attractive external coloring that limits viewing therethrough, while at the same time providing a transparent external portion which permits viewing therethrough. It would be particularly desirable to provide an article or container as aforesaid which can be injection molded or injection stretch blow molded. A discrete view stripe in such an article or container would be particularly desirable.

Accordingly, it is an object of the present invention to provide an opaque, hollow plastic article that includes a transparent portion thereof, wherein the opaque portion limits viewing the inside of the article and the transparent portion permits viewing the inside portion therethrough.

It is a further object of the present invention to provide an article as aforesaid which is a plastic container, particularly a container that can be injection molded and/or injection blow molded.

Further objects and advantages of the present invention will appear hereinbelow.

SUMMARY OF THE INVENTION

In accordance with the present invention the foregoing objects and advantages are readily obtained.

The present invention provides an improved, hollow plastic article. The plastic article has a hollow inside portion and an outside wall portion, wherein the outside wall portion is opaque and includes a transparent portion thereof, wherein the opaque portion limits viewing the inside portion therethrough and the transparent portion permits viewing the inside portion therethrough. Desirably, the plastic article is a plastic container with the outside wall portion including a base wall portion, a side wall portion extending upwardly from the base wall portion, a neck wall portion extending upwardly from the side wall portion, and an opening above the neck wall portion to the inside of the container. The transparent portion is preferably a view stripe extending longitudinally along the side wall portion, preferably along the entire side wall portion, thus permitting the entire contents of the container to be clearly seen through the view stripe while maintaining a desirable opaque coloring on the remainder of the outside surface.

The present invention also provides a method for forming hollow plastic articles. The method comprises: injection molding a plastic article having a hollow inside portion and an outside wall portion, including the steps of, injection molding a primary opaque plastic material into an injection mold through an injection channel and a valve gate, wherein said injection channel includes a valve stem, and wherein the primary plastic material converges around the valve stem; injection molding a transparent secondary material into said injection mold through said injection channel and valve gate, wherein the secondary plastic material is introduced into said injection channel where the primary plastic material converges around the valve stem so that said secondary plastic material maintains laminar flow through the injection channel and into the injection mold; wherein the outside wall portion of the resultant plastic article is opaque with a transparent portion adjacent the opaque portion so that the inside portion can be seen through the transparent portion.

Preferably, a plastic container is injection molded with a base wall portion, a side wall portion extending upwardly from the base wall portion, a neck wall portion extending upwardly from the side wall portion, and an opening above the neck wall portion to the inside portion. Desirably, the transparent portion is formed in the shape of a stripe along the side wall portion of the plastic container to enable one to clearly see the contents of the container through the stripe. In accordance with the present invention an injection molded preform is preferably first formed, and a blow molded container formed from the injection molded preform.

Further features of the present invention will appear hereinbelow.

BRIEF DESCRIPTION OF THE DRAWINGS

The present invention will be more readily understandable from a consideration of the following illustrative drawings, wherein:

FIG. 3 is a side view of a preform prepared in accordance with the present invention; and FIG. 4 is a side view of a blow molded container prepared in accordance with the present invention.

DETAILED DESCRIPTION OF PREFERRED EMBODIMENTS

In accordance with the preferred embodiment a preform or parison is formed by injection molding with a transparent or clear view stripe thereon, and subsequently stretch blow molded into a blown container also with the view stripe thereon. Thus, the preferred container of the present invention is an injection stretch blown container which has an opaque color and with a transparent or clear view stripe thereon. The desirable opaque color limits or entirely prevents viewing the inside of the container. However, the container is preferably provided with a transparent or clear view stripe, preferably extending longitudinally along the side wall of the container and desirably along the entire side wall. The view stripe permits one to readily view the inside of the container.

Figure 1:
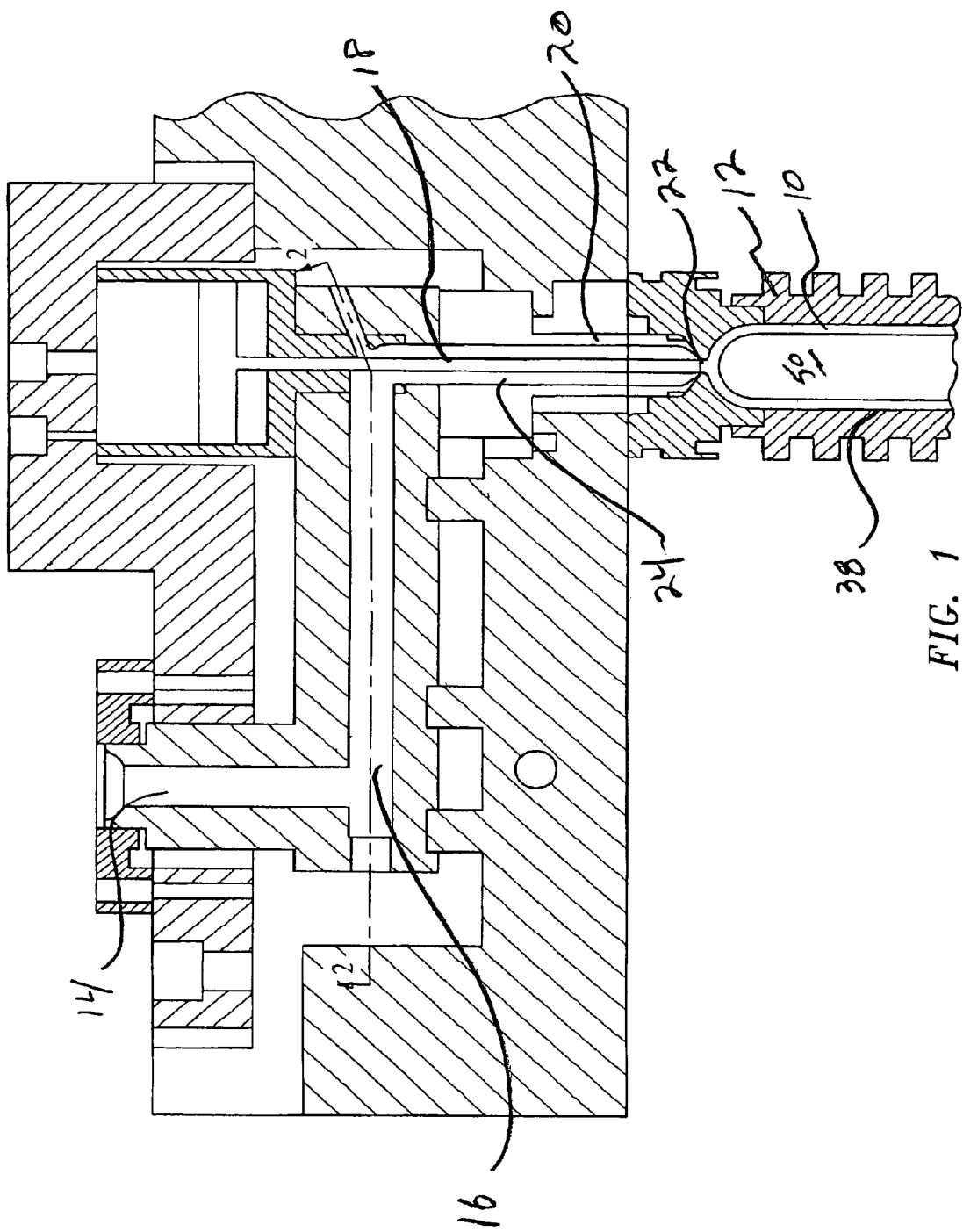
FIG. 1 is a sectional view of an illustrative apparatus for forming a preform in accordance with the present invention.

Thus, referring to FIG. 1, a preform 10 is formed by injection mold 12. A primary, molten plastic material is injected from first channel 14 to transverse channel 16. The primary plastic material flows in transverse channel 16 towards valve stem 18. The valve stem is located in injection nozzle 20 and injection channel 24 and is movable by suitable motive means (not shown) to open or close preform gate 22. When gate 22 is open plastic material can flow from the injection channel or second channel 24, which surrounds valve stem 18, into injection mold 12 to form preform 10, and when gate 22 is closed plastic is blocked from flowing into the injection mold.

The primary plastic material can be any desired opaque or colored plastic suitable for injection molding and injection stretch blow molding, for example, polyethylene terephthalate, polyolefins, polypropylene, polyethylene naphthalate, polyvinyl chloride, and others, with polyethylene terephthalate being preferred.

Figure 2:
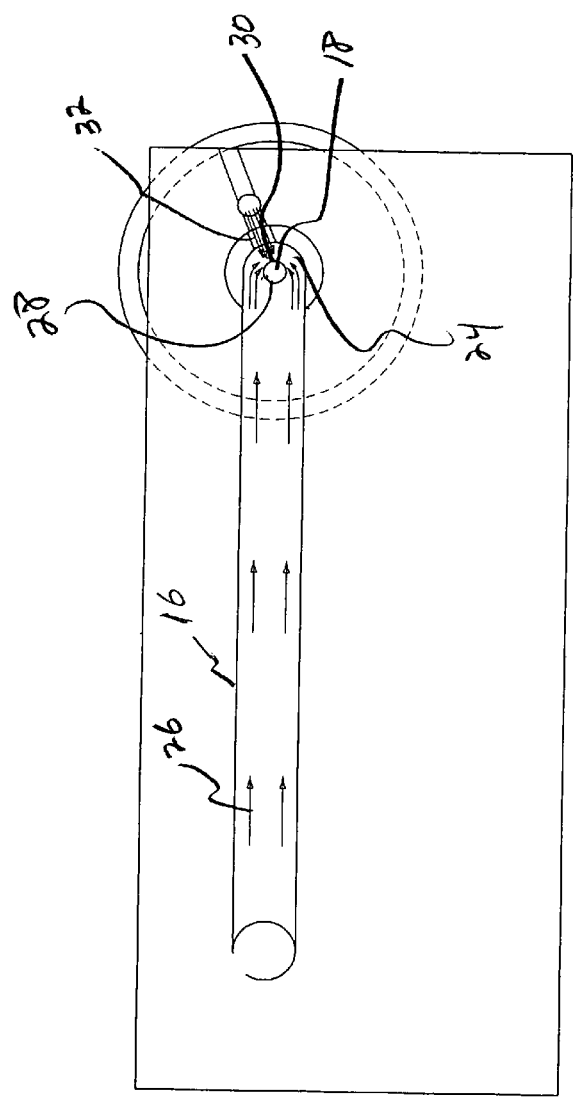
FIG. 2 is a sectional view along lines 2—2 of FIG. 1.

In operation, as shown in FIG. 2, the primary plastic material 26 flows in transverse channel 16 towards the forward face 28 of valve stem 18. The valve stem 18 is located in injection channel 24 and the forward face 28 of valve stem 18 is the face of the valve stem which faces transverse channel 16. The flow of the primary plastic material 26 is, therefore, interrupted by the forward face 28 of valve stem 18 resulting in the flow of the primary plastic 26 around valve stem 18, wherein the flow converges at the rearward face 30 of valve stem 18 to reform or weld together at that location. The angle of contact between the flow of the primary plastic and the forward face of the valve stem is not critical, but approximately perpendicular or 60 to 90 degrees is preferred.

In accordance with the present invention, however, the secondary plastic material 32 is introduced into injection channel 24 at the rearward face 30 of valve stem 18 resulting in the primary plastic 26 meeting the secondary plastic at that location and the two materials flowing together through the injection channel and preform with the secondary material maintaining laminar flow throughout the injection channel and preform.

Thus, the opaque primary plastic material forms the major portion 34 of preform 10 (see FIG. 3), and the secondary plastic material forms the view stripe 36 in preform 10. In the preferred embodiment the secondary plastic is continuously introduced at the rearward face 30 of valve stem 18 to form a continuous view stripe 36 along the entire side wall as shown in FIG. 3. However, if a small amount of secondary plastic is introduced one will form a discrete transparent or clear portion which acts as a window for viewing the inside of the resultant preform and final blow molded article.

The preform 10 has a hollow inside portion 50 and an outside wall portion 38 and includes base wall portion 40, side wall portion 42 extending upwardly from the base wall portion, neck wall portion 44, preferably including threaded area 46, extending upwardly from the side wall portion, and an opening 48 above the neck wall portion to the inside 50 of the preform. The clear or transparent view stripe 36 acts as a window and permits one to see inside the preform, which would normally be blocked by the opaque or colored material of the primary plastic. The view stripe, as shown in FIG. 3, desirably extends longitudinally and continuously along the base wall portion, side wall portion and neck wall portion of the preform.

The secondary plastic material, similar to the primary plastic material, can be any desired plastic such as the materials listed for the primary plastic. As indicated above, the secondary material should be transparent or clear. Desirably, the same plastic used for the primary plastic material should be used for the secondary plastic material.

In general, each extruder maintains standard processing temperatures for the base material used, for example, if polyethylene terephthalate (PET) is used one should preferably use temperatures of from 520° F. to 550° F. No special processing conditions for the materials employed are needed.

The preform 10 with view stripe 36 is then preferably stretch blow molded into a blow molded container 52 as shown in FIG. 4. Naturally, the resultant container may have any desired configuration and the configuration shown in FIG. 4 is exemplificative only.

Thus, in blow molded container 52 the opaque primary material forms the major portion 54 of the blow molded container (see FIG. 4) as in the preform. Similarly, the secondary plastic material forms the view stripe 56. The present invention can use a single stage injection, i.e., the injected performs are injected and blown on the same machine. Alternatively, one can use a two stage injection, i.e., the injected preforms are loaded into a separate blow molding machine. In the two stage procedure the preforms may need to be oriented to insure that the view stripe on the preform is in the proper location in the blown container.

In a manner after the structure of the preform, blow molded container 52 includes base wall portion 58, side wall portion 60 extending upwardly from the base wall portion, neck wall portion 62, preferably including a threaded portion as in the preform (not shown), extending upwardly from the side wall portion, and an opening to the inside of the container. In the embodiment of FIG. 4 a cover 64 is screwed onto the neck wall portion and covers the opening of the container. The view stripe 56, or view window, as in the preform extends continuously and longitudinally along the base, side wall and neck wall portion of the container and permits one to see inside the container which would normally be blocked by the opaque colored material of the primary plastic.

The width of the view stripe in the preform and in the blown container is not critical, but would preferably be from one-eighth of an inch to one half inch wide.

Thus, the preform and container of the present invention represent a highly advantageous improvement in this art. One can effectively utilize a desirable color in the major portion of the finished article which would block viewing the interior while simply and conveniently providing a clear or transparent area, as a view stripe or view window, so that the entire inside can be clearly seen. Moreover, the process for obtaining this is simple and expeditious. For example, one can effectively package a variety of items in these containers, as ketchup, motor oil, etc.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A hollow plastic article, which comprises:
   a plastic article which is an injection stretch blow molded container which is blow molded from an injection molded preform, said container having a hollow inside portion and an outside wall portion, said outside wall portion including a base wall portion, a side wall portion extending upwardly from the base wall portion, a neck wall portion extending upwardly from the side wall portion and an opening above the neck wall portion to the inside portion; and
   wherein the outside wall portion is opaque and wherein the outside wall portion includes a transparent portion thereof which is a stripe extending continuously and longitudinally along the base wall portion, side wall portion and neck wall portion, with the opaque portion forming the major portion of the container limiting viewing of the inside portion therethrough and the transparent portion permitting viewing of the inside portion therethrough.

2. An article according to claim 1, wherein said plastic is polyethylene terephthalate.

3. An article according to claim 1, wherein said transparent portion is a clear portion, and wherein said opaque portion is a colored portion.

4. An article according to claim 1, wherein said view stripe is from one-eighth inch to one-half inch in width.

5. An article according to claim 1, wherein the same plastic material is used for the opaque portion and the transparent portion.

6. An article according to claim 1, wherein the neck wall portion includes a threaded area.

* * * * *